(12) United States Patent
Choi et al.

(10) Patent No.: US 8,612,982 B2
(45) Date of Patent: Dec. 17, 2013

(54) MULTI-TASKING METHOD ACCORDING TO SIMPLE PRIORITY INHERITANCE SCHEME AND EMBEDDED SYSTEM THEREFOR

(75) Inventors: Gyu-sang Choi, Seoul (KR); Jung-keun Park, Seoul (KR); Chae-seok Im, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1537 days.

(21) Appl. No.: 11/984,993

(22) Filed: Nov. 26, 2007

(65) Prior Publication Data

US 2008/0168454 A1 Jul. 10, 2008

(30) Foreign Application Priority Data

Jan. 5, 2007 (KR) .......................... 10-2007-0001699

(51) Int. Cl.
*G06F 9/46* (2006.01)
(52) U.S. Cl.
USPC .......................... 718/102; 718/103; 718/104
(58) Field of Classification Search
None
See application file for complete search history.

(56) References Cited

U.S. PATENT DOCUMENTS

| | | | |
|---|---|---|---|
| 7,574,205 B2 * | 8/2009 | Lee | 455/418 |
| 2002/0083063 A1 | 6/2002 | Egolf | |
| 2005/0050541 A1 | 3/2005 | Sun et al. | |
| 2005/0050552 A1 | 3/2005 | Fuller | |

OTHER PUBLICATIONS

Extended European Search Report for corresponding European Application 08100138.0/1243; dated Dec. 28, 2009.
Eun-Mi Lee and Shin Heu, "A Resource Control Technique in Distributed Real-Time Systems", 161-172pp; Aug. 12, 1999.
Korean Office Action for corresponding Korean Application 10-2007-0001699; dated Mar. 20, 2008.
Inhyuk Kim et al., "A Scheme for Resolving Priority Inversions in Real-time Operating Systems", Proc. of the $32^{nd}$ KIISE Fall Conference, vol. 32, No. 2(1), 2005.
Embedded System Programming: Theory and Practice, "Chapter 4. Real-time Operating System and Embedded System", Jonghwa Na, Scitech Media, Oct. 2004.
Korean Office Action dated Feb. 25, 2010 issued in corresponding Korean Patent Application 10-2007-0001699.

* cited by examiner

*Primary Examiner* — Camquy Truong
(74) *Attorney, Agent, or Firm* — Staas & Halsey LLP

(57) ABSTRACT

A multi-tasking method performs a plurality of tasks according to priority of each of the plurality of tasks. It is determined whether a resource that is to be used by a current task is being used by another task, a priority of the current task is compared to a priority of the task that is using the resource according to a result of the determination, and according to a result of the comparison, the priority of the task that is using the resource is increased to a highest priority of priorities of all tasks trying to occupy a CPU. Accordingly, conventional problems in the BPI and IIP schemes can be solved.

9 Claims, 7 Drawing Sheets

MULTI-TASKING METHOD ACCORDING TO SIMPLE PRIORITY INHERITANCE SCHEME AND EMBEDDED SYSTEM THEREFOR

CROSS-REFERENCE TO RELATED APPLICATIONS

This application claims the benefit of Korean Patent Application No. 10-2007-0001699, filed on Jan. 5, 2007, in the Korean Intellectual Property Office, the disclosure of which is incorporated herein in its entirety by reference.

BACKGROUND

1. Field

The present invention relates to a multi-tasking method of performing a plurality of tasks according to a priority of each of the plurality of tasks, and an embedded system therefor.

2. Description of the Related Art

Operating Systems (OSs) in embedded systems can be divided into Real Time OSs (RTOSs) and non-RTOSs. Representative RTOSs among commercialized OSs are VxWorks, pSOS, VRTX, QNX, Nucleus, MC/OSII, and OSE. These RTOSs commonly support preempted multi-tasking for stopping execution of a certain task and executing another task first.

In order for the RTOSs to support the preempted multi-tasking, each of the tasks must have a priority. Real-time in an RTOS means that an execution end time of a certain task must be in an expected schedule. In particular, when an execution end time of a specific task must be observed more severely than other tasks, the priority of the specific task is set higher compared to other tasks. For example, the shorter an execution period of a task is, the more severely an execution end time of the task must be observed. If priorities of tasks are inverted, execution end times of the tasks cannot be in an expected schedule, resulting in ruining the real-time characteristic in an RTOS.

FIG. 1 is a timing diagram to describe priority inversion in an RTOS.

Referring to FIG. 1, there exist three tasks, and durations in which each of the tasks is executed by occupying a Central Processing Unit (CPU) are marked. A first task having the lowest priority from among the three tasks preempts the CPU. The first task locks a mutex (Mutual Exclusion object) of a certain resource while occupying the CPU. In particular, portions in which the mutex is locked are marked darker from among the CPU occupation durations in FIG. 1. The mutex is an object to prevent a plurality of tasks from using a single resource at the same time. The fact that a task locks a mutex of a predetermined resource means that the task possesses the mutex of the predetermined resource, i.e., that only that task can use the predetermined resource. In addition, only that task can release the mutex lock of the predetermined resource.

Thereafter, a third task having a higher priority than that of the first task preempts the CPU. The third task attempts to lock the mutex of the resource while occupying the CPU. However, since the resource is mutex-locked by the first task, the third task cannot use the resource. As a result, the execution of the third task is blocked, and the execution of the first task resumes. Thereafter, a second task having a priority higher than that of the first task and lower than that of the third task preempts the CPU. The second task does not need the resource. Thus, the second task does not try the mutex lock of the resource and continuously occupies the CPU until the execution of the second task ends. As a result, an effect that the execution of the third task is delayed due to the execution of the second task having a lower priority than that of the third task, i.e., priority inversion, occurs.

In order to solve the priority inversion, various schemes have been suggested. Representative schemes are a Basic Priority Inversion (BPI) scheme and an Immediate Inheritance Protocol (IIP) scheme.

FIG. 2 is a flowchart of a multi-tasking method according to the BPI scheme in a conventional embedded system. In particular, the multi-tasking process illustrated in FIG. 2 is a mutex lock setting process from among an entire multi-tasking process.

Referring to FIG. 2, in operation 21, the embedded system searches for a task having the highest priority (hereinafter, "current task") from among tasks that are ready to be executed.

The embedded system determines in operation 22 whether a mutex lock of a resource that is to be used by the current task found in operation 21 exists. If it is determined in operation 22 that the mutex lock does not exist, the process proceeds to operation 23, and if it is determined in operation 22 that the mutex lock exists, the process proceeds to operation 25.

The embedded system locks a mutex of the resource with respect to the current task in operation 23.

The embedded system executes the current task using the mutex locked resource in operation 24.

The embedded system compares a priority of the current task and a priority of a task which is using the resource in operation 25. If the priority of the current task is higher than the priority of the task possessing the mutex lock of the resource, the process proceeds to operation 26, otherwise the process proceeds to operation 28.

The embedded system increases the priority of the task possessing the mutex lock of the resource to the priority of the current task in operation 26.

The embedded system increases the priorities of tasks nested in the task possessing the mutex lock of the resource to the priority of the current task in operation 27.

The embedded system controls the current task to wait in operation 28 until the mutex lock of the resource does not exist, and the process proceeds to operation 22. Tasks nested in a task are tasks in a relationship that the latter task uses a result obtained by executing the former task. In particular, this priority increase scheme is called priority inheritance, which will now be described.

FIG. 3 is a diagram to describe the priority inheritance in BPI.

Referring to FIG. 3, a first task uses a resource corresponding to a second mutex, a second task outputs the resource corresponding to the second mutex and uses a resource corresponding to a fourth mutex, and a fourth task outputs the resource corresponding to the fourth mutex. In this case, if only the priority of the first task is increased to the priority of a current task, the execution of the first task is not blocked by a task having a lower priority than the priority of the current task, but the execution of the second task or the fourth task may be blocked by a task having lower priority than the priority of the current task. As a result, the resource corresponding to the second mutex, which is a result obtained by executing the second task, or the resource corresponding to the fourth mutex, which is a result obtained by executing the fourth task, is not output, and therefore, the first task may not use the resource corresponding to the second mutex.

Thus, an embedded system must increase the priorities of all tasks nested in a task possessing a mutex lock of a predetermined resource to the priority of a current task. However, this is a considerable overhead of embedded systems, and the real-time characteristic of embedded systems may be significantly ruined.

FIG. 4 is a flowchart of a multi-tasking method according to the IIP scheme in a conventional embedded system. In particular, the multi-tasking process illustrated in FIG. 4 is a mutex lock setting process from among an entire multi-tasking process.

Referring to FIG. 4, in operation 41, the embedded system searches for a task having the highest priority (hereinafter, "current task") from among tasks that are ready to be executed.

The embedded system determines in operation 42 whether a mutex lock of a resource that is to be used by the current task found in operation 41 exists. If it is determined in operation 42 that the mutex lock does not exist, the process proceeds to operation 43, and if it is determined in operation 42 that the mutex lock exists, the process proceeds to operation 46.

The embedded system locks a mutex of the resource with respect to the current task in operation 43.

The embedded system increases the priority of the current task possessing the mutex lock to the highest priority of priorities of all tasks desiring to preempt a CPU in operation 44.

The embedded system executes the current task using the mutex-locked resource in operation 45.

The embedded system controls the current task to wait in operation 46 until the mutex lock of the resource does not exist, and the process proceeds to operation 42.

As described above, the IIP scheme may be very simple and effective. However, since the priority of a current task possessing a mutex lock is increased without any condition, if priority inversion does not occur, i.e., if the current task uses a different resource from that used by a task having a higher priority than that of the current task, the execution of the task having the higher priority than that of the current task may be delayed until the execution of the current task is completed. In particular, the IIP scheme may result in frequently blocking the execution of a task having a higher priority due to the execution of a task having a lower priority in a process in which a mutex lock duration frequently appears, significantly ruining the real-time characteristic of embedded systems.

SUMMARY

The present embodiment provides a multi-tasking method and an embedded system in order to solve problems of conventional Basic Priority Inversion (BPI) and Immediate Inheritance Protocol (IIP) schemes.

The present embodiment also provides a computer-readable recording medium storing a computer-readable program to execute the multi-tasking method.

Additional aspects and/or advantages will be set forth in part in the description which follows and, in part, will be apparent from the description, or may be learned by practice of the invention.

The foregoing and/or other aspects are achieved by providing a multi-tasking method of executing a plurality of tasks according to a priority of each of the plurality of tasks, the multi-tasking method comprising: determining whether a resource that is to be used by a first task of the plurality of tasks is being used by a second task; comparing the priority of the first task and the priority of the second task according to the determination result; and increasing the priority of the second task to a highest priority of all of the priorities of the plurality of tasks according to the comparison result.

According to another aspect of the present embodiment, there is provided a computer-readable recording medium storing a computer-readable program to cause a processor to execute the multi-tasking method.

The foregoing and/or other aspects are achieved by providing an embedded system to execute a plurality of tasks according to a priority of each of the plurality of tasks, a Central Processing Unit (CPU) of the embedded system including: a task processing unit determining whether a resource that is to be used by a first task of the plurality of tasks is being used by a second task; and a priority processing unit comparing the priority of the first task and the priority of the second task according to the determination result and increasing the priority of the second task to a highest priority of all of the priorities of the plurality of tasks according to the comparison result.

BRIEF DESCRIPTION OF THE DRAWINGS

The above and other aspects and advantages will become more apparent by describing in detail an embodiment thereof with reference to the attached drawings in which.

DETAILED DESCRIPTION OF THE EMBODIMENTS

Figure 1:
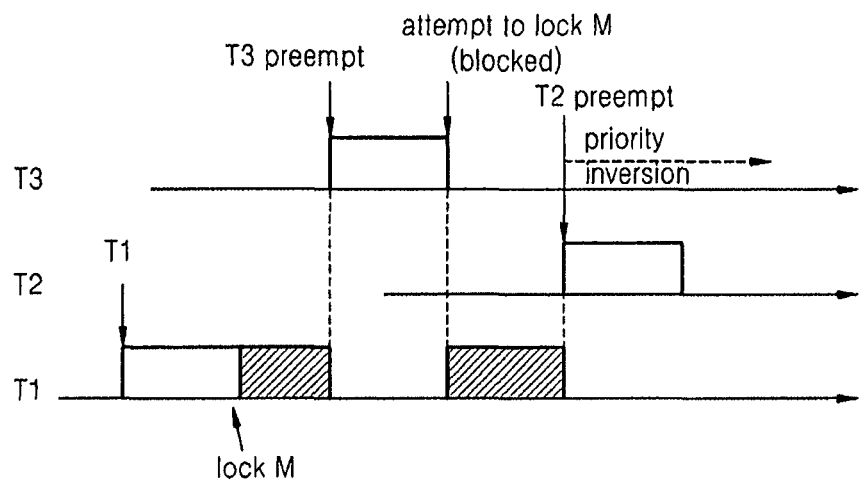
FIG. 1 is a timing diagram to describe priority inversion in a Real Time Operating System (RTOS)
Figure 2:
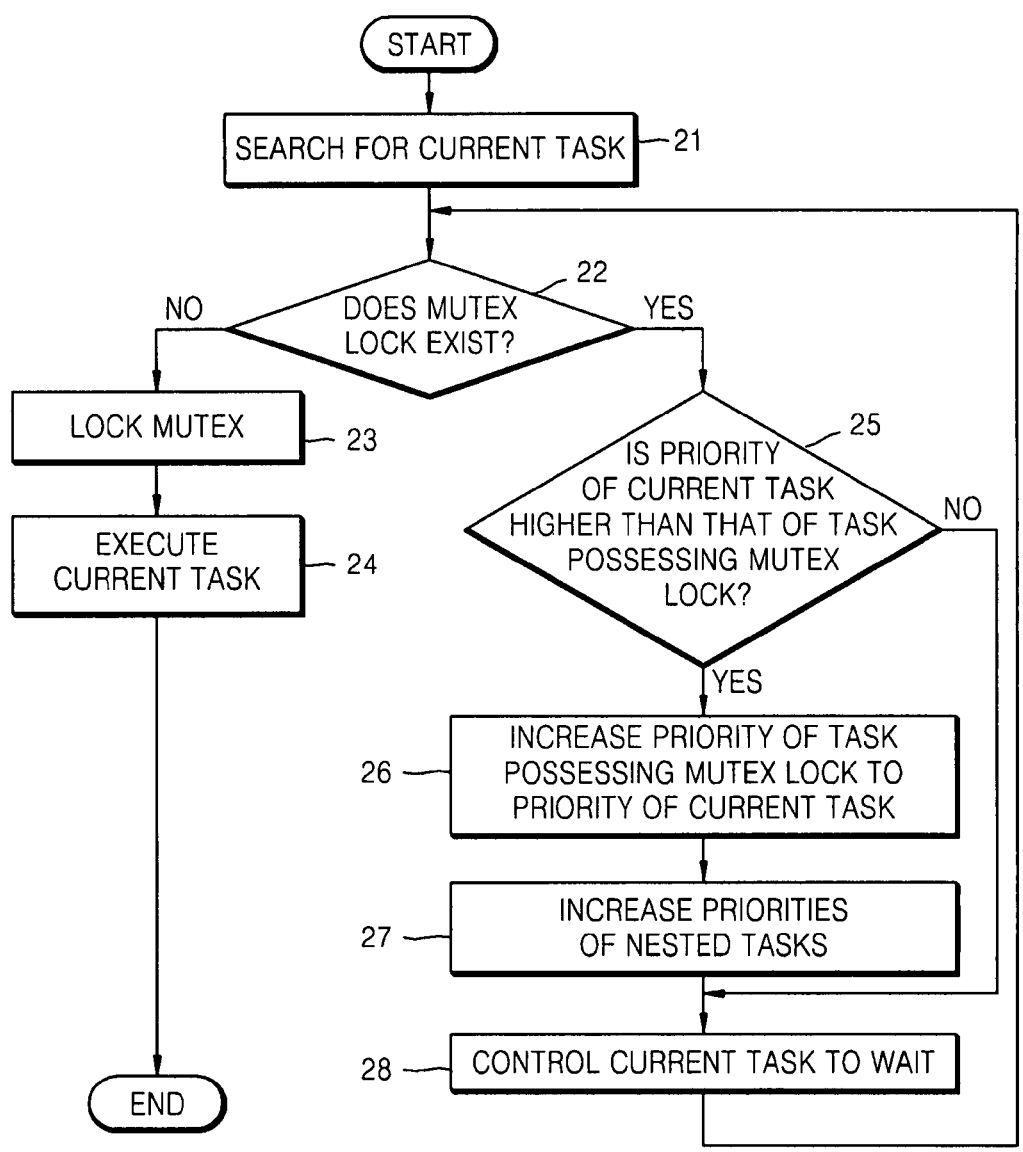
FIG. 2 is a flowchart of a multi-tasking method according to a Basic Priority Inversion (BPI) scheme in a conventional embedded system.
Figure 3:
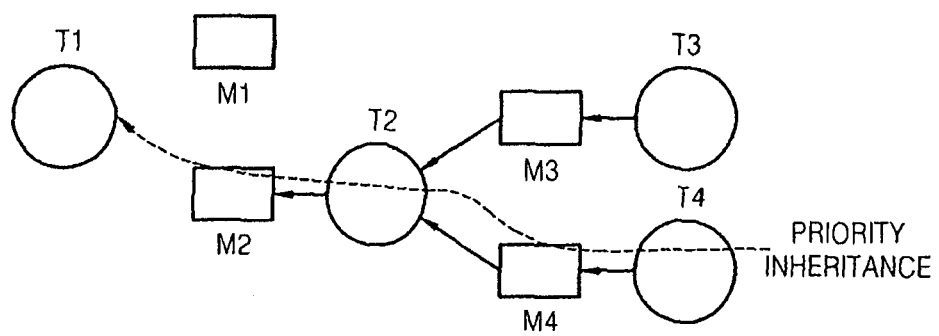
FIG. 3 is a diagram for describing priority inheritance in BPI.
Figure 4:
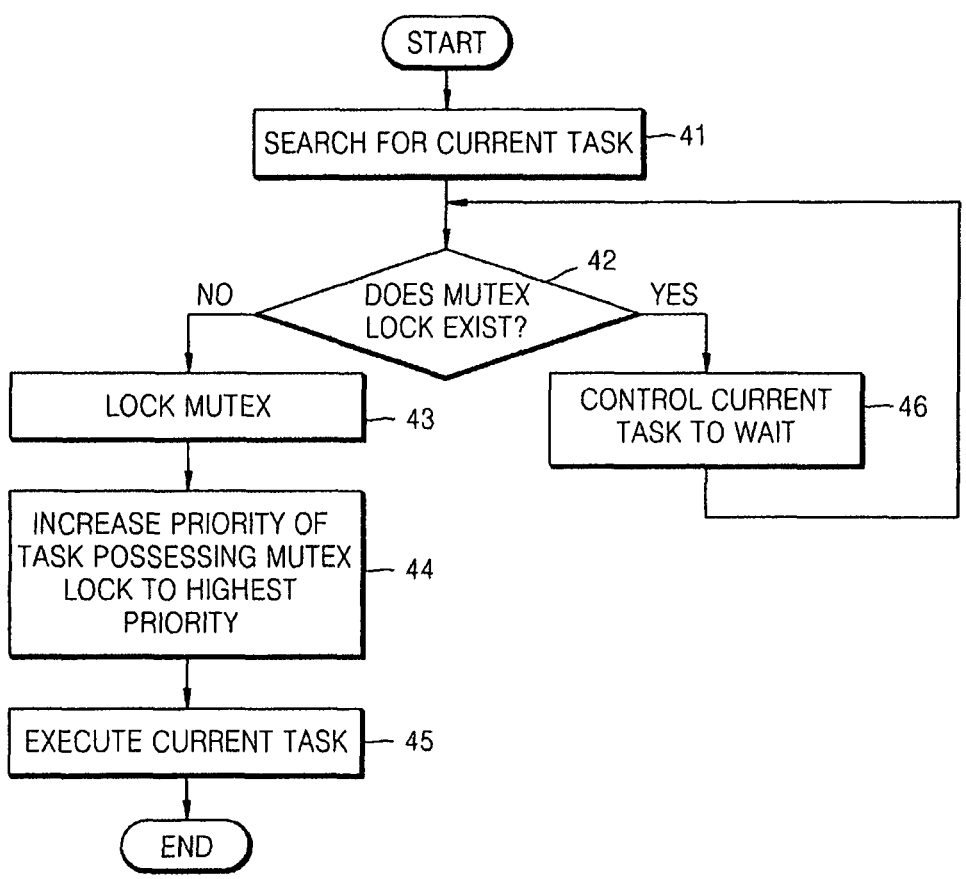
FIG. 4 is a flowchart of a multi-tasking method according to an Immediate Inheritance Protocol (IIP) scheme in a conventional embedded system.

Reference will now be made in detail to the embodiment, examples of which are illustrated in the accompanying drawings, wherein like reference numerals refer to the like elements throughout. The embodiment is described below to explain the present invention by referring to the figures.

Figure 5:
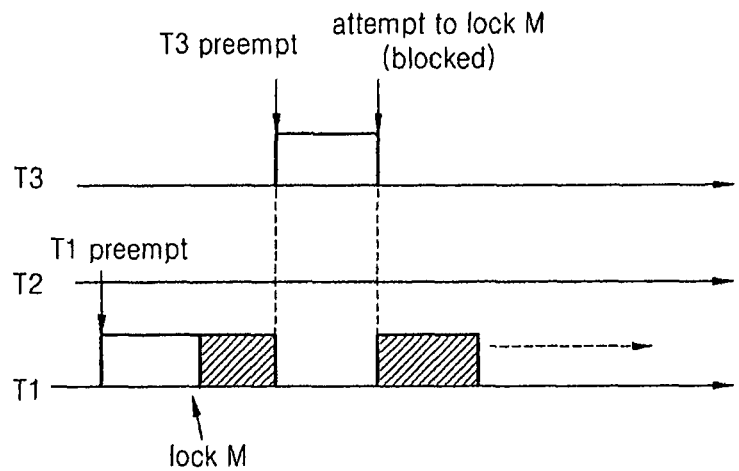
FIG. 5 is a timing diagram to describe a Simple Priority Inheritance (SPI) scheme according to an embodiment.

FIG. 5 is a timing diagram to describe a Simple Priority Inheritance (SPI) scheme according to an embodiment.

Referring to FIG. 5, there exist three tasks, and durations in which each of the tasks is executed by occupying a Central Processing Unit (CPU) are marked. A first task having the lowest priority from among the three tasks preempts the CPU. The first task locks a mutex (Mutual Exclusion object) of a certain resource while occupying the CPU. In particular, portions in which the mutex is locked are marked darker from among the CPU occupation durations in FIG. 5. Thereafter, a third task having a higher priority than that of the first task preempts the CPU. The third task attempts to lock the mutex of the resource while occupying the CPU. However, since the resource is mutex-locked by the first task, the third task cannot use the resource. As a result, the execution of the third task is blocked, and the execution of the first task resumes.

Unlike the BPI scheme, the SPI scheme according to an embodiment of the present invention increases the priority of the first task to the highest priority of priorities of all tasks trying to occupy the CPU instead of increasing the priority of the first task to the priority of the third task. In addition, unlike the IIP scheme, the SPI scheme increases the priority of the first task to the highest priority only if the third task tries to the lock the mutex, i.e., only if the priority inversion occurs, instead of increasing the priority of the first task to the highest priority without any condition. When the SPI scheme is used, since the priority of the first task is increased to the highest priority, the problem of the BPI scheme that a system overhead increases due to the priority inheritance can be solved. In addition, since the priority of the first task is increased to the highest priority only if the priority inversion occurs, the problem of the IIP scheme that the execution of a task having a higher priority is frequently blocked due to the execution of a task having a lower priority can be solved.

Hereinafter, a multi-tasking method and an embedded system according to the SPI scheme will be described in detail.

Figure 6:
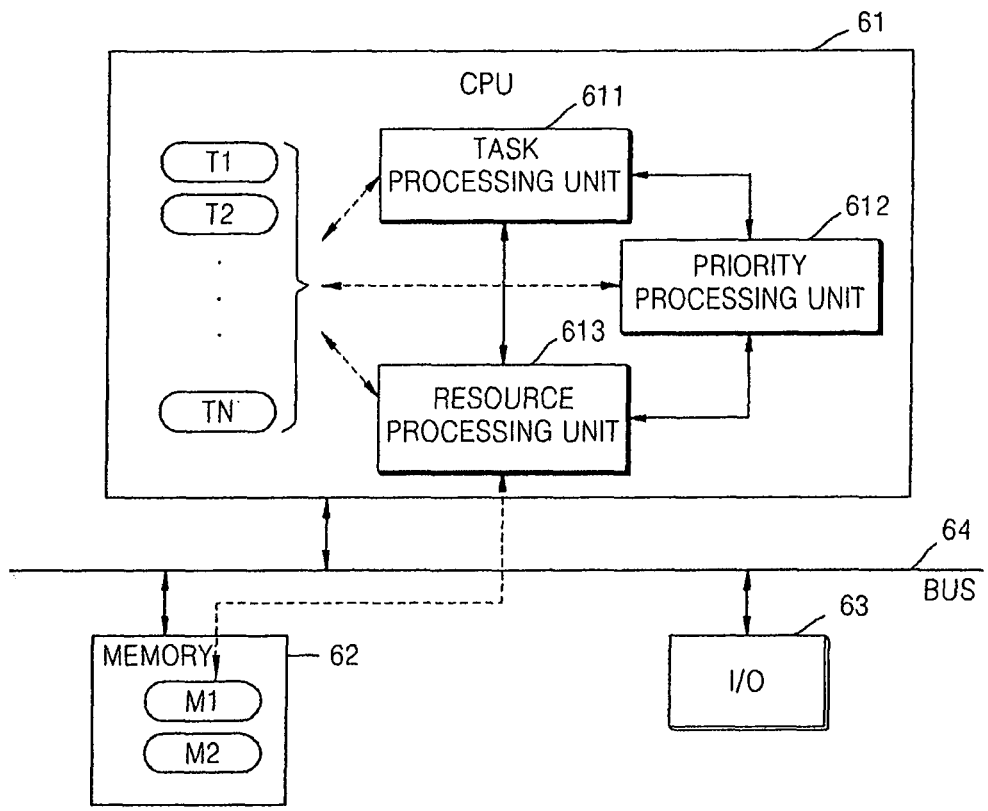
FIG. 6 is a block diagram of an embedded system according to an embodiment.

FIG. 6 is a block diagram of an embedded system according to an embodiment.

Referring to FIG. 6, the embedded system includes a CPU 61, a memory 62, an input/output (I/O) device 63, and a bus 64. However, the configuration of the embedded system illustrated in FIG. 6 is only one of the simplest samples to describe the current embodiment, and it will be understood by those of ordinary skill in the art that other components may further be included.

The CPU 61 receives data from the I/O device 63 via the bus 64 according to a Real Time Operating System (RTOS) stored in the memory 62. The CPU 61 also executes a task to process the received data. The CPU 61 also outputs a result obtained by processing the task to the I/O device 63 via the bus 64. In particular, the CPU 61 supports a multi-tasking function to execute a plurality of tasks T1, T2 through to TN according to a priority of each of the plurality of tasks T1, T2 through to TN.

According to the current embodiment, the CPU 61 includes a task processing unit 611, a priority processing unit 612, and a resource processing unit 613. However, the configuration of the CPU 61 illustrated in FIG. 6 is only one of the simplest samples to describe the current embodiment, and it will be understood by those of ordinary skill in the art that other components may further be included.

The task processing unit 611 determines whether a task having the highest priority from among tasks having priorities assigned by the priority processing unit 612 is ready to be executed. If the task having the highest priority is not ready to be executed, the task processing unit 611 determines whether a task having the second highest priority is ready to be executed. By repeating the above-described procedure, the task processing unit 611 searches for a task having the highest priority (hereinafter, "current task") from among tasks that are ready to be executed.

In addition, the task processing unit 611 executes the current task using a resource allowed to the current task by the resource processing unit 613. In more detail, the task processing unit 611 executes the current task using a resource mutex-locked by the resource processing unit 613. In addition, if the priority of the current task is not higher than that of a task which is using the resource as a result of a comparison performed by the priority processing unit 612, the task processing unit 611 controls the current task to wait until a right of use of the resource is released. In more detail, if the priority of the current task is not higher than that of a task possessing a mutex lock of the resource, the task processing unit 611 controls the current task to wait until the mutex lock of the resource does not exist. In addition, if a mutex lock possessed by the current task is released by the resource processing unit 613, the task processing unit 611 wakes up a waiting task.

The priority processing unit 612 assigns priorities to a plurality of tasks by considering attributes of the plurality of tasks. For example, the shorter an execution period of a task is, the higher priority the priority processing unit 612 assigns to the task. In addition, if another task is using the resource as a result of a determination performed by the resource processing unit 613, the priority processing unit 612 compares the priority of the current task and that of the task that is using the resource. In more detail, if a mutex lock of the resource that is to be used by the current task exists as a result of the determination performed by the resource processing unit 613, the priority processing unit 612 compares the priority of the current task and that of a task possessing the mutex lock of the resource.

If the priority of the current task is higher than that of the task that is using the resource as a result of the comparison, the priority processing unit 612 increases the priority of the task that is using the resource to the highest priority of priorities of all tasks which are trying to occupy the CPU 61. In more detail, if the priority of the current task is higher than that of a task possessing a mutex lock of the resource, the CPU 61 increases the priority of the task possessing the mutex lock of the resource to the highest priority of priorities of all tasks which are trying to occupy the CPU 61. In addition, if the current task executed by the task processing unit 611 ends, the priority processing unit 612 determines whether the priority of the current task has increased, and if the priority of the current task has increased, the priority processing unit 612 restores the priority of the current task to the original priority.

The resource processing unit 613 determines whether a resource that is to be used by a current task found by the task processing unit 611 is being used by another task. In more detail, the resource processing unit 613 determines whether the resource that is to be used by the current task is being used by another task by determining whether a mutex lock of the resource exists. Representative examples of a resource which cannot be simultaneously used by a plurality of tasks are specific areas M1 and M2 of the memory 62. If a plurality of tasks simultaneously use a specific area of the memory 62, data stored in the specific area is changed every time each of the plurality of tasks is executed, resulting in a wrong result for each task.

If the resource is not used by another task as a result of the determination, the resource processing unit 613 grants a right of use of the resource to the current task. In more detail, if a mutex lock of the resource does not exist as a result of the determination, the resource processing unit 613 grants the right of use of the resource to the current task by locking a mutex of the resource. If it is determined that the priority of the current task is restored by the priority processing unit 612 or has not been increased, the resource processing unit 613 releases the mutex lock possessed by the current task.

Figure 7:
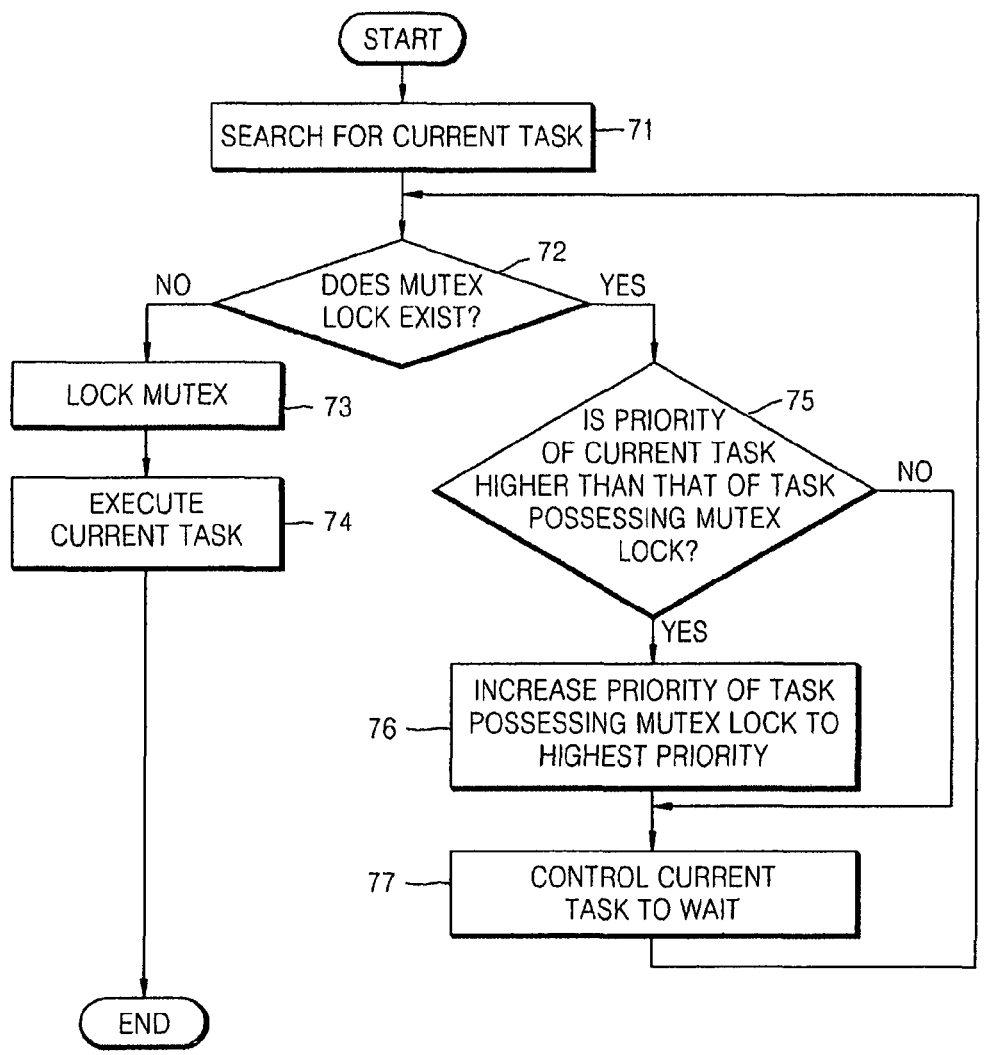
FIG. 7 is a flowchart of a multi-tasking method according to an embodiment.

FIG. 7 is a flowchart of a multi-tasking method according to an embodiment.

Referring to FIG. 7, the multi-tasking method includes operations sequentially processed by the embedded system illustrated in FIG. 6. Thus, although not fully described, the contents relating to the embedded system illustrated in FIG. 6 also apply to the multi-tasking method according to the current embodiment. In particular, the multi-tasking process illustrated in FIG. 7 is a mutex lock setting process of an entire multi-tasking process.

In operation 71, the embedded system searches for a task having the highest priority (hereinafter, "current task") from among tasks that are ready to be executed.

The embedded system determines in operation 72 whether a mutex lock of a resource that is to be used by the current task found in operation 71 exists. If it is determined in operation 72 that the mutex lock does not exist, the process proceeds to operation 73, and if it is determined in operation 72 that the mutex lock exists, the process proceeds to operation 75.

The embedded system locks a mutex of the resource in operation 73.

The embedded system executes the current task using the mutex-locked resource in operation 74.

The embedded system compares the priority of the current task and the priority of a task, which is using the resource, in operation 75. If the priority of the current task is higher than the priority of the task possessing the mutex lock of the resource, the process proceeds to operation 76, otherwise the process proceeds to operation 77.

The embedded system increases the priority of the task possessing the mutex lock of the resource to the highest priority of priorities of all tasks which are trying to occupy the CPU 61 in operation 76.

The embedded system controls the current task to wait in operation 77 until the mutex lock of the resource does not exist, and the process proceeds to operation 72.

Figure 8:
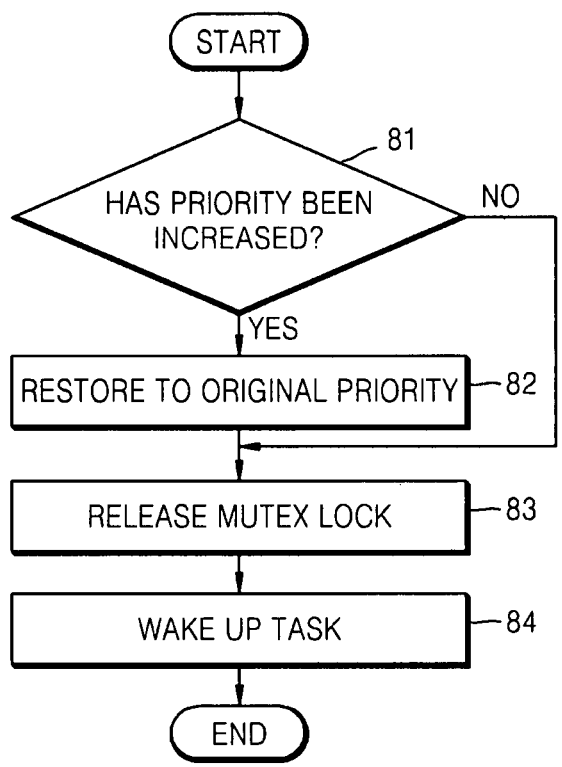
FIG. 8 is a flowchart of a process of releasing a mutex (Mutual Exclusion object) lock after a process of setting the mutex lock illustrated in FIG. 7 is performed, according to an embodiment.

FIG. 8 is a flowchart of a process of releasing the mutex lock after the mutex lock setting process illustrated in FIG. 7 is performed, according to an embodiment.

Referring to FIG. 8, if the execution of the current task ends, the embedded system determines in operation 81 whether the priority of the current task has been increased. If it is determined in operation 81 that the priority of the current task has been increased, the process proceeds to operation 82, otherwise the process proceeds to operation 83.

The embedded system restores the priority of the current task to the original priority in operation 82.

The embedded system releases the mutex lock of the resource in operation 83.

The embedded system wakes up a waiting task in operation 84.

It will be understood by those skilled in the art that the tasks described above may be called threads and applied to the embodiment. In general, a task is the minimum unit of scheduling to grant a use order of a CPU to a plurality of processes, and a thread is the minimum unit of scheduling, which is executed as a portion of a process.

The embodiment can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), and media such as carrier waves (e.g., transmission through the Internet).

As described above, according to the present embodiment, unlike the BPI scheme, by increasing a priority of a task possessing a mutex lock to the highest priority of priorities of all tasks trying to occupy the CPU instead of increasing the priority of the task possessing the mutex lock to a priority of a current task, the problem of the BPI scheme that a system overhead increases due to priority inheritance can be solved. This occurs because all tasks possessing a mutex lock have the highest priority, and even when a plurality of mutex locks overlap each other, the priority inheritance is not needed.

In addition, unlike the IIP scheme, by increasing the priority of a task possessing a mutex lock to the highest priority only if a resource that is to be used by a current task is being used by the task possessing the mutex lock, i.e., only if priority inversion occurs, instead of increasing the priority of the task possessing the mutex lock to the highest priority without any condition, the problem of the IIP scheme that the execution of a task having a higher priority is frequently blocked due to the execution of a task having a lower priority can be solved.

Although an embodiment has been shown and described, it would be appreciated by those skilled in the art that changes may be made in this embodiment without departing from the principles and spirit of the invention, the scope of which is defined in the claims and their equivalents.

What is claimed is:

1. A multi-tasking method of executing a plurality of tasks according to a priority of each of the plurality of tasks, the multi-tasking method comprising:
   determining, by at least one processor, whether a resource that is to be used by a first task of the plurality of tasks is being used by a second task, wherein the first task is a task having the highest priority from among tasks which are ready to be executed by a Central Processing Unit (CPU);
   comparing, by at least one processor, the priority of the first task and the priority of the second task according to the determination result and determining that the priority of the first task is higher than the priority of the second task; and
   increasing, by at least one processor, the priority of the second task to a highest priority of all of the priorities of all tasks which are trying to occupy the CPU, according to the comparison result,
   wherein the all tasks include the tasks which are ready to be executed by the CPU and tasks which are not ready to be executed by the CPU.

2. The multi-tasking method of claim 1, wherein the determining comprises determining whether the resource is being used by the second task by determining whether a mutex (Mutual Exclusion object) lock for the resource that is to be used by the first task exists.

3. The multi-tasking method of claim 1, further comprising:
   granting a right of use of the resource to the first task when it is determined that the resource is not being used by the second task; and
   executing the first task using the resource allowed to the first task.

4. The multi-tasking method of claim 3, wherein the granting comprises granting the right of use of the resource to the first task by locking a mutex of the resource for the first task.

5. A non-transitory computer-readable storage medium storing a computer-readable program to cause a processor to execute a multi-tasking method of executing a plurality of tasks according to a priority of each of the plurality of tasks, the multi-tasking method comprising:
   determining whether a resource that is to be used by a first task of the plurality of tasks is being used by a second task, wherein the first task is a task having the highest priority from among tasks which are ready to be executed by a Central Processing Unit (CPU);
   comparing the priority of the first task and the priority of the second task according to the determination result and determining that the priority of the first task is higher than the priority of the second task; and
   increasing the priority of the second task to a highest priority of all of the priorities of tasks which are trying to occupy the CPU, according to the comparison result, wherein the all tasks include the tasks which are ready to be executed by the CPU and tasks which are not ready to be executed by the CPU.

6. An embedded system to execute a plurality of tasks according to a priority of each of the plurality of tasks, a Central Processing Unit (CPU) of the embedded system comprising:
   a task processing unit determining whether a resource that is to be used by a first task of the plurality of tasks is being used by a second task, wherein the first task is a task having the highest priority from among tasks which are ready to be executed by the CPU; and
   a priority processing unit comparing the priority of the first task and the priority of the second task according to the determination result and determining that the priority of the first task is higher than the priority of the second task and increasing the priority of the second task to a highest priority of all of the priorities of all tasks which are trying to occupy the CPU, according to the comparison result,
   wherein the all tasks include the tasks which are ready to be executed by the CPU and tasks which are not ready to be executed by the CPU.

7. The embedded system of claim 6, wherein the task processing unit determines whether the resource is being used by the second task by determining whether a mutex (Mutual Exclusion object) lock for the resource that is to be used by the first task exists.

8. The embedded system of claim 6, further comprising:
   a resource processing unit granting a right of use of the resource to the first task if it is determined that the resource is not being used by the second task,
   wherein the task processing unit executes the first task using the resource allowed to the first task.

9. The embedded system of claim 8, wherein the resource processing unit grants the right of use of the resource to the first task by locking a mutex of the resource for the first task.

* * * * *

UNITED STATES PATENT AND TRADEMARK OFFICE
CERTIFICATE OF CORRECTION

PATENT NO. : 8,612,982 B2  
APPLICATION NO. : 11/984993  
DATED : December 17, 2013  
INVENTOR(S) : Gyu-sang Choi et al.

Page 1 of 1

It is certified that error appears in the above-identified patent and that said Letters Patent is hereby corrected as shown below:

In the Claims,

Column 8, Line 58, In Claim 5, Delete "haying" and insert -- having --, therefor.

Column 8, Line 66, In Claim 5, Delete "tasks" and insert -- all tasks --, therefor.

Signed and Sealed this  
Fourth Day of November, 2014

Michelle K. Lee  
*Deputy Director of the United States Patent and Trademark Office*